(12) United States Patent
Kato (10) Patent No.: US 7,248,212 B2
(45) Date of Patent: Jul. 24, 2007

(54) SATELLITE-POSITIONING SIGNAL RECEIVING DEVICE

(75) Inventor: Koji Kato, Toyoake (JP)

(73) Assignee: DENSO CORPORATION, Kariya (JP)

( * ) Notice: Subject to any disclaimer, the term of this patent is extended or adjusted under 35 U.S.C. 154(b) by 258 days.

(21) Appl. No.: 11/004,994

(22) Filed: Dec. 7, 2004

(65) Prior Publication Data

US 2005/0162307 A1    Jul. 28, 2005

(30) Foreign Application Priority Data

Jan. 22, 2004  (JP)  ............................. 2004-014814

(51) Int. Cl.
  *G01S 1/00*   (2006.01)
  *H04B 7/185*  (2006.01)

(52) U.S. Cl. ............................... 342/357.06

(58) Field of Classification Search .......... 342/357.06, 342/357.12, 358

See application file for complete search history.

(56) References Cited

U.S. PATENT DOCUMENTS 4,928,106 A * 5/1990 Ashjaee et al. ............. 342/352

6,498,584 B2   12/2002 Naruse

FOREIGN PATENT DOCUMENTS

| EP | 1 067 395      | 1/2001   |
| EP | 1067395 A1 *   | 1/2001   |
| JP | A-6-34738      | 2/1994   |
| JP | A-2000-115013  | 4/2000   |
| JP | A-2003-133981  | 5/2003   |

* cited by examiner

*Primary Examiner*—Thomas H. Tarcza
*Assistant Examiner*—Nga X. Nguyen
(74) *Attorney, Agent, or Firm*—Posz Law Group, PLC (57) ABSTRACT

A satellite-positioning receiving device includes: an antenna which receives a signal from a satellite; an RF amplifier unit which amplifies the signal received by the antenna; a reference quartz oscillator; a digital processor unit which performs signal processing; an operation accepting unit; and two reception processing systems, that is, a first reception processing system including a first mixer unit, a first local oscillator, a first IF amplifier unit, and a first IF filter unit and a second reception processing system including a second mixer unit, a second local oscillator, a second IF amplifier unit, and a second IF filter unit. The digital processor unit is connected to the local oscillators and the IF filter units, and is so constituted that it is capable of individually changing and setting their characteristics.

15 Claims, 7 Drawing Sheets

SATELLITE-POSITIONING SIGNAL RECEIVING DEVICE

CROSS REFERENCE TO RELATED APPLICATIONS

This application is based on and incorporates herein by reference Japanese Patent Application No. 2004-14814 filed on Jan. 22, 2004.

FIELD OF THE INVENTION

The present invention relates to a device that receives a satellite-positioning signal corresponding to each of multiple satellite-positioning signal kinds.

BACKGROUND OF THE INVENTION

A global positioning system (GPS) is widely known as a system for positioning, for example, in car navigation systems. The GPS is a positioning system so designed that the apparent distances between GPS satellites and a GPS receiving device are measured and the position of the receiving device is computed. (For example, refer to Patent Document 1.) This receiving device receives 1575.42 MHz signals designated as L1. Signals of 1227.6 MHz and 1176.45 MHz will be available in the future, respectively, as a second signal (L2C) for civilian applications and a third signal (L5C) for civilian applications. In addition, the Galileo system under development in Europe will be available. In the Galileo system as well, signals of a plurality of frequencies are provided. When a plurality of these signals can be utilized, the performance of receiving devices can be enhanced further than ever. (For example, the reception area can be widened, and the positioning accuracy can be enhanced.)

Patent Document 1: JP-H06-0347387 A

Figure 9:
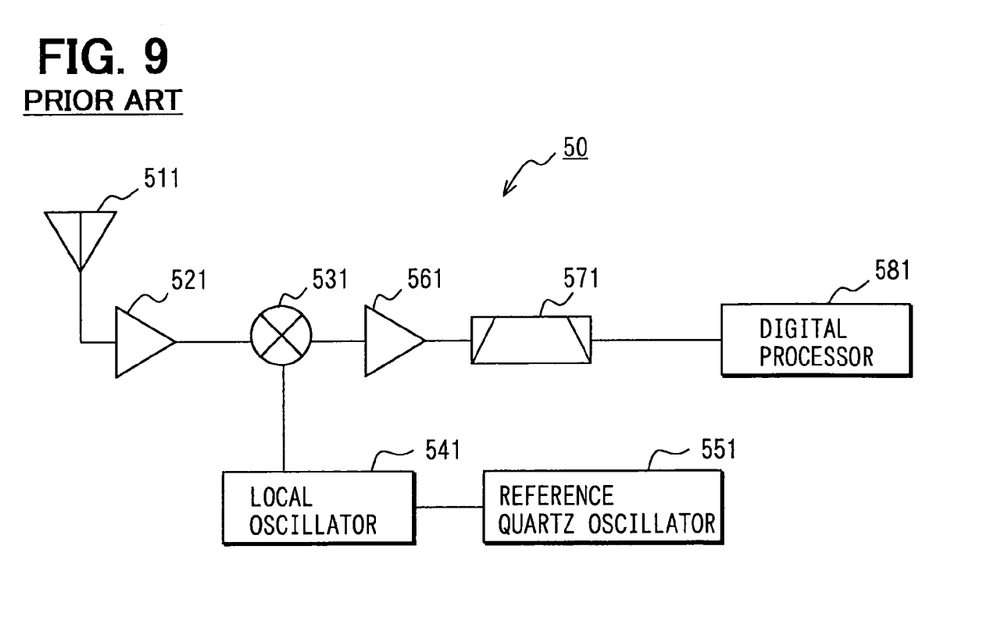
FIG. 9 is a block diagram illustrating a general constitution of a conventional GPS receiving device in a prior art.

However, the present GPS receiving devices involve a problem. As described above, the present GPS receiving device is designed for one kind of reception signal, and thus so constituted as to accommodate only the frequency and bandwidth of that signal. FIG. 9 illustrates an example of the constitution of the GPS receiving device 501. The GPS receiving device 511 illustrated in FIG. 9 includes: an antenna 511 for receiving GPS signals; an RF amplifier unit 521 which amplifies the GPS signals received by the antenna 511; a mixer unit 531 which carries out frequency conversion; a local oscillator 541 used in frequency conversion; a reference quartz oscillator 551; an IF amplifier unit 561 which amplifies intermediate frequencies; an IF filter unit 571 for intermediate frequencies; and a digital processor unit 581 which performs signal processing. The GPS receiving device 501 operates as follows: GPS signals transmitted from GPS satellites are received by the antenna unit 511, and these GPS signals are amplified by the RF amplifier unit 521. The frequencies of the signals are converted into intermediate frequencies by the mixer unit 531. The signals are amplified by the IF amplifier unit 561, and processed by the digital processor unit 581.

Because of the above-mentioned constitution, the GPS receiving device 501 illustrated in FIG. 9 cannot receive signals of different frequency or bandwidth, such as "GPS-L2C," "GPS-L5C," and "Galileo" scheduled to become available in the future. To accommodate these signals that will newly become available in the future, a processing system that supports the new signal frequencies and bandwidths will be required. To attain this object, there is a problem. More specific description will be given. For example, the processing system including the mixer unit, local oscillator, reference quartz oscillator, IF amplifier unit, and IF filter unit, illustrated in FIG. 9 will be required by a number equivalent to the number of signals to be received. To support all the signals, the scale of the receiving device must be increased.

To detect a position utilizing GPS, two methods are used: two-dimensional positioning in which signals are received from three GPS satellites, and three-dimensional positioning in which signals are received from four or more GPS satellites. Positions cannot be detected only by two or less satellite. For this reason, a problem arises. In the same place, positioning can be carried out in some periods of time and cannot in other periods of time depending on the relation between the positions of GPS satellites and the present position and the environment around the present position (e.g. valley between tall buildings). In some periods of time, signals can be received from three or more satellites, and in other periods of time, signals can be received only from two or less satellite.

Another problem exists. In high-latitude land areas, the number of satellites from which signals can be received is small, and the present position is often difficult to determine.

SUMMARY OF THE INVENTION

The present invention has been made with the above problems taken into account. It is an object of the present invention is to realize a receiving device that is of small scale in constitution but yet capable of making effective use of a plurality of different kinds of satellite-positioning signals that will become available in the future.

The satellite-positioning signal receiving device of the present invention made to solve the above problems is a device that receives a satellite-positioning signal transmitted in a form of radio waves from an artificial satellite for use in a satellite-positioning system. The signal receiving device includes n reception processing systems, each of which performs processing for receiving a satellite-positioning signal kind and is formed so that its reception characteristic is changed, wherein the n is an integer not less than one. A selecting unit is included for selecting n different satellite-positioning signal kinds from within m different satellite-positioning signal kinds, wherein the m is an integer not less than two. A controlling unit is further included for changing the reception characteristics of the n reception processing systems to correspond to the selected n different satellite-positioning signal kinds.

The satellite-positioning signal presently used in navigation systems and the like for positioning is only GPS-L1 (carrier frequency: 1575.42±1 MHz). However, in addition to GPS-L1, the following satellite-positioning signals (or signal kinds) are scheduled to become available in the future:

GPS-L1 (1575.42±1 MHz)
GPS-L2C (1227.6±1 MHz)
GPS-L5C (1176.45±10 MHz)
Galileo-L1 (1575.42±2 MHz)
Galileo-E5a (1176.45±10 MHz)
Galileo-E5b (1207.14±10 MHz)
Galileo-E6 (1278.75×5.115 MHz)

According to the present invention, these available signal kinds can be arbitrarily selected and used, and the present invention is applicable to a wide variety of intended uses. With respect to the device configuration therefor, different kinds need not be provided in correspondence with the available satellite-positioning signal kinds, and the device can be implemented with small-scale configuration.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

Hereafter, description will be given to embodiments to which the present invention is applied, referring to the drawings. Embodiments of the present invention are not limited to those described below, and the present invention can be embodied in various modes as long as its technical scope is not exceeded.

First Embodiment

Figure 1:
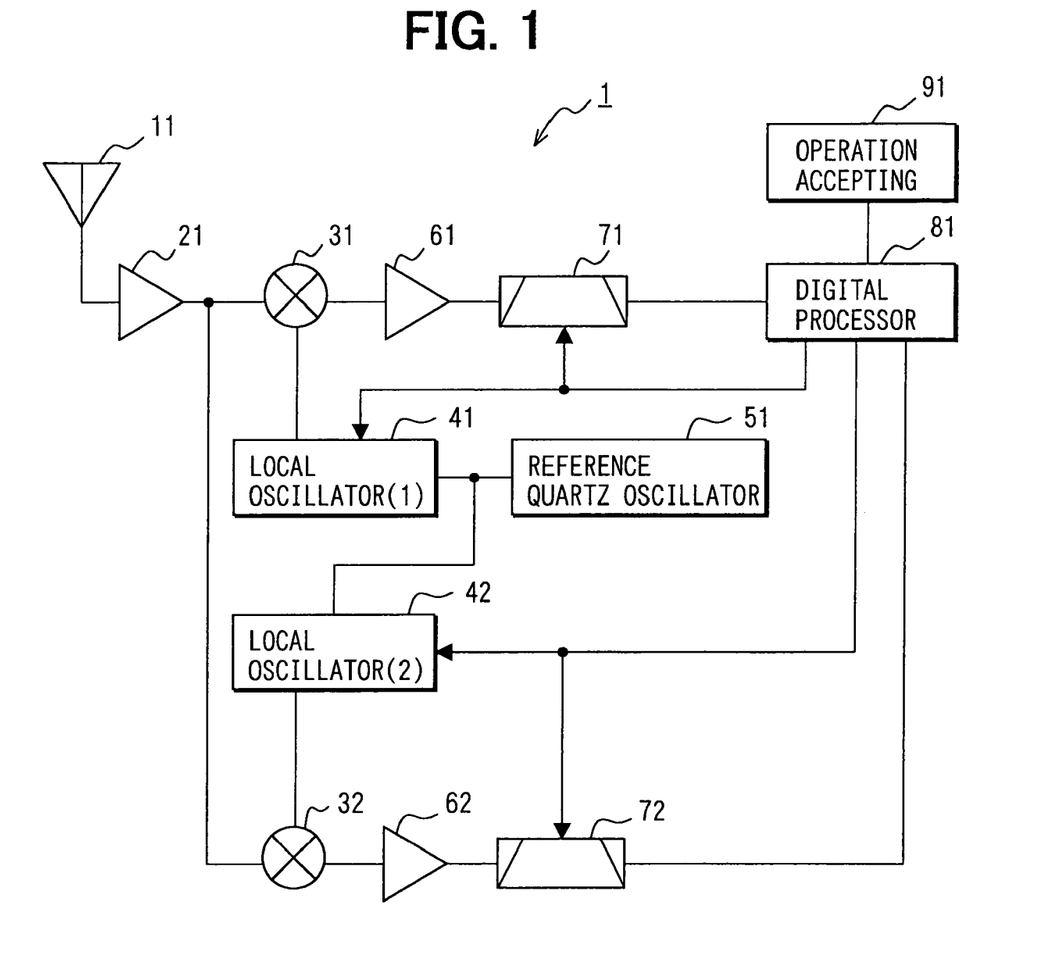
FIG. 1 is a block diagram illustrating a general constitution of the satellite-positioning signal receiving device having two reception processing systems according to a first embodiment of the present invention.

FIG. 1 is a block diagram illustrating a general constitution of a signal receiving device 1 for satellite positioning having two reception processing systems according to a first embodiment of the present invention.

The signal receiving device 1 for satellite positioning in this embodiment includes: an antenna 11 which receives signals from satellites; an RF amplifier unit 21 which amplifies the signals received by the antenna 11; a reference quartz oscillator 51; a digital processor unit 81 which performs signal processing; an operation accepting unit 91 which accepts the user's operation; and two reception processing systems, that is, a first reception processing system including a mixer unit (1) 31, a local oscillator (1) 41, an IF amplifier unit (1) 61, and an IF filter unit (1) 71, and a second reception processing system including a mixer unit (2) 32, a local oscillator (2) 42, an IF amplifier unit (2) 62, and an IF filter unit (2) 72. When the first reception processing system and the second reception processing system must be discriminated from each other in the following description, the numbers (1) and (2) are added like "mixer unit (1) 31, mixer unit (2) 32" as in the above description. When these reception processing systems need not be discriminated from each other, the number (1) or (2) is not added, and they are collectively referred to like "mixer units 31 and 32."

The above-mentioned mixer units 31 and 32 are intended to convert the frequencies of signals outputted from the RF amplifier unit 21 into intermediate frequencies, and the local oscillators 41 and 42 are used in this frequency conversion. The IF amplifier units 61 and 62 are intended to amplify the intermediate frequencies outputted from the mixer units 31 and 32, and the IF filter units 71 and 72 perform predetermined filter processing on the intermediate frequencies amplified by the IF amplifier units 61 and 62.

Signals which underwent filter processing at the IF filter units 71 and 72 are outputted to the digital processor unit 81, and is demodulated to data at the digital processor unit 81. The satellite-positioning signals demodulated to data are outputted to, for example, a navigation device (not shown).

The digital processor unit 81 includes a microcomputer and the like, and performs varied control processing for the above-mentioned data demodulation. The digital processor unit 81 is connected to the local oscillators 41 and 42 and the IF filter units 71 and 72, and is so constituted that their characteristics can be individually changed and set. The local oscillators 41 and 42 are connected to the one reference quartz oscillator 51, and generate frequencies according to instructions from the digital processor unit 81, using a reference frequency obtained from the reference quartz oscillator 51.

With this constitution, satellite-positioning signal kinds to be received are selected based on the user's operation accepted at the operation accepting unit 91, for example. Alternatively, satellite-positioning signal kinds to be received are selected by the digital processor unit 81 based on the state of reception of satellite-positioning signal kinds. Then the characteristics of the local oscillators 41 and 42 and the IF filter units 71 and 72 (equivalent to reception characteristics described in the claims) are changed and set.

In this embodiment, seven different kinds of satellite-positioning signals are selectable:
(1) GPS-L1 (1575.42±1 MHz)
(2) GPS-L2C (1227.6±1 MHz)
(3) GPS-L5C (1176.45±10 MHz)
(4) Galileo-L1 (1575.42±2 MHz)
(5) Galileo-E5a (1176.45±10 MHz)
(6) Galileo-E5b (1207.14±10 MHz)
(7) Galileo-E6 (1278.75±5.115 MHz)

To receive these satellite-positioning signal kinds, specifically, the reception characteristics of the local oscillators 41 and 42 and the IF filter units 71 and 72 are set as follows:

The GPS-L1 signal under Item (1) above will be taken as an example. The GPS-L1 signal is a signal with carrier frequency of 1575.42 MHz and with bandwidth of 2 MHz. The frequency of the local oscillator 41 (or 42) varies depending on what the setting of intermediate frequency is.

For example, when the intermediate frequency is 4.092 MHz, the frequency of the local oscillator can be set to 1571.328 MHz. That is, the local oscillator 41 (or 42) is set to 1571.328 MHz, and the IF filter unit 71 (or 72) is set to 2 MHz. This setting may be made by linear voltage levels, or may be made with digital signals. When the setting is made by linear voltage levels, for example, control is carried out so as to apply voltages of desired levels. When an example is taken with respect to the local oscillator 41 (or 42), the details of control is as follows:

2.5V to set to 1571.328 MHz
1.0V to set to 1223.508 MHz
0.78V to set to 1172.358 MHz When the setting is made with digital signals, control is carried out by combination of High (H) and Low (L). When an example is taken, the details of control is as follows:

H, H to set to 1571.328 MHz
H, L to set to 1223.508 MHz
L, H to set to 1172.358 MHz This is the same with the IF filter unit 71 (or 72).

Next, description will be given to the operation of the signal receiving device 1 for satellite positioning in this embodiment with a special focus on the details of processing performed at the digital processor unit 81.

In Case of Manual Selection

Figure 2:
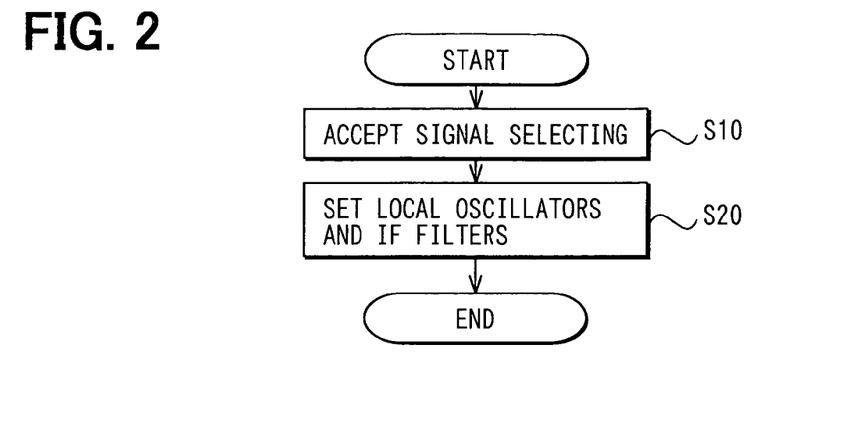
FIG. 2 is a flowchart illustrating the details of processing performed by the digital processor unit when the reception characteristics are changed and set by manual selection according to the first embodiment.

FIG. 2 is a flowchart illustrating the details of processing performed by the digital processor unit 81 in the following case: reception characteristics are changed and set so that satellite-positioning signals selected based on the user's operation accepted at the operation accepting unit 91 (selection corresponding to manual operation) can be received. The programs for performing this processing are stored in ROM and the like in the digital processor unit 81. This is the same with the other processing described below.

First, the signal selecting operation performed by the user at the operation accepting unit 91 is accepted (Step S10). This selecting operation may be so constituted that any two signals can be selected from among the seven different kinds of satellite-positioning signals, described under Items (1) to (7) above, for example. Alternatively, the following constitution may be adopted: combinations of signal kinds to be received are set and stored beforehand in the memory in the digital processor unit 81, and the user selects one from among the combinations. Possible combinations include:

Two-frequency positioning based on the combination of GPS-L1 and GPS-L2C
Two-frequency positioning based on the combination of GPS-L1 and GPS-L5C
GPS-Galileo hybrid positioning based on the combination of GPS-L1 and Galileo-L1
Two-frequency positioning based on the combination of Galileo-L1 and Galileo-E5a
Positioning supporting commercial services based on the combination of Galileo-L1 and Galileo-E6

Next, the frequencies of the local oscillators 41 and 42 and the characteristics of the IF filter units 71 and 72 are changed and set so that the satellite-positioning signals, selected by the selecting operation accepted at Step S10, can be received (Step S20).

In Case of Automatic Selection

Figure 3:
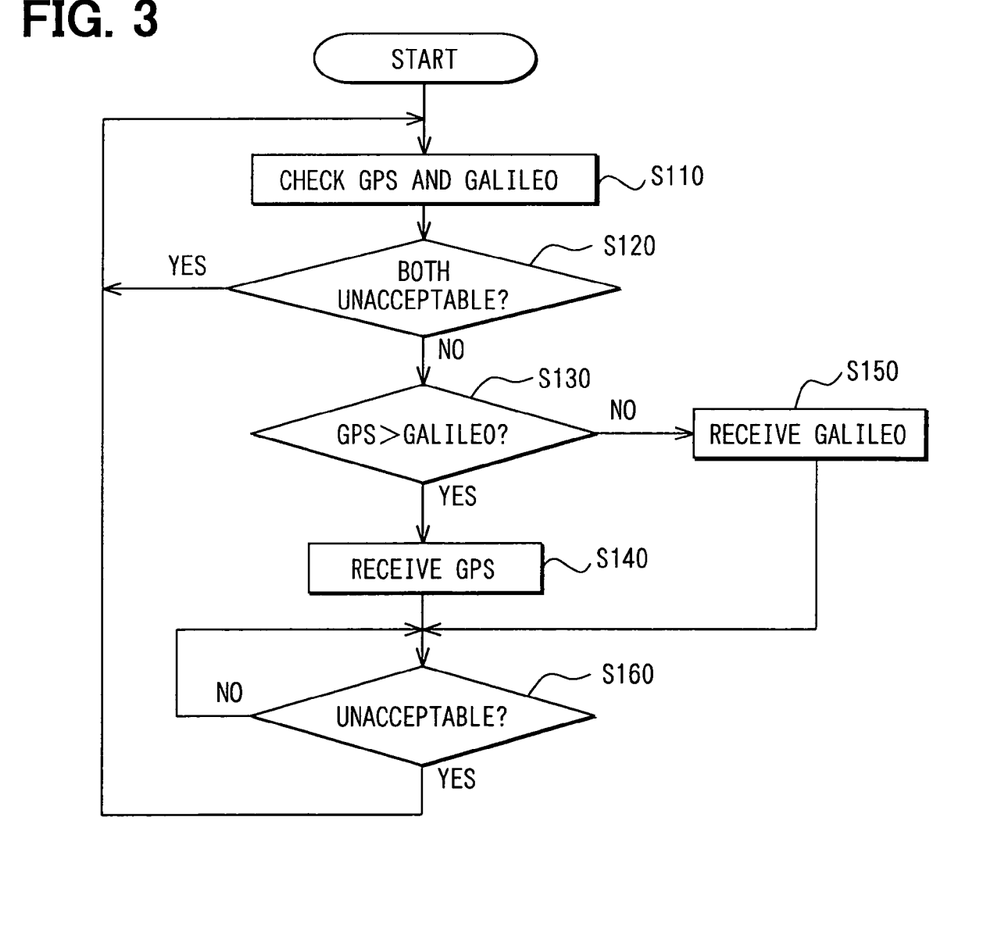
FIG. 3 is a flowchart illustrating the details of processing performed by the digital processor unit when the reception characteristics are changed and set by automatic selection according to the first embodiment.

FIG. 3 is a flowchart illustrating the details of processing performed by the digital processor unit 81 in the following case: the digital processor unit 81 selects satellite-positioning signals to be received (as a receiving target) based on the state of reception of satellite-positioning signals (automatic selection), and changes and sets reception characteristics so that the selected satellite-positioning signals can be received.

First, the digital processor unit 81 changes and sets the frequencies of the local oscillators 41 and 42 and the characteristics of the IF filter units 71 and 72 as default setting. This setting is made so that any satellite-positioning signal belonging to GPS and any satellite-positioning signal belonging to the Galileo system will be taken as signals to be received (receiving targets), respectively, in the first reception processing system and in the second reception processing system. Then the state of reception of each signal is checked (Step S110).

Possible signals received with the default setting at Step S110 include GPS-L1 and Galileo-L1. Needless to add, signals of other frequencies may be used.

Then, it is determined whether or not the state of reception of both the satellite-positioning signals, checked at Step S110, is unacceptable (Step S120). For checking the state of reception, for example, the DOP (Dilution Of Precision) can be used. In general, the precision is enhanced with decrease in DOP, and lower values of DOP indicate that "the state of reception is acceptable or favorable." Therefore, the following procedure can be taken: a threshold value of DOP is preset, and when the threshold value is exceeded, the state of reception is determined to be unacceptable.

To determine the acceptability of the state of reception, for example, the number of satellites that can be acquired may be used in place of DOP. More specifically, the state of reception is determined according to whether n (for example, three or four) or more normal decode signals required for high-precision positioning are obtained by signals from either satellite-positioning system or not.

When affirmative determination is made at Step S120, that is, when the state of reception of both the satellite-positioning signals is unacceptable, the operation returns to Step S110. When the state of reception of either satellite-positioning signal is acceptable, the operation proceeds to Step S130, and the following is determined: whether the state of reception of the satellite-positioning signal belonging to GPS is more acceptable than the state of reception of the satellite-positioning signal belonging to the Galileo system or not. When the state of reception of the satellite-positioning signal belonging to GPS is more acceptable than the state of reception of the satellite-positioning signal belonging to the Galileo system (Step S130: YES), control is carried out so as to receive the satellite-positioning signal belonging to GPS (Step S140). When the state of reception of the satellite-positioning signal belonging to GPS is not more acceptable than the state of reception of the satellite-positioning signal belonging to the Galileo system (Step S130: NO), control is carried out so as to receive the satellite-positioning signal belonging to the Galileo system (Step S150).

With respect to the reception control at Step S140 and Step S150, for example, the following methods are possible: a simple method in which, of the satellite-positioning signals for which the state of reception was checked at Step S110, only the GPS-side signal or the Galileo system-side signal is demodulated to data and used; and a method in which control is carried out so as to receive signals of two different frequencies belonging to the same system. More specific description will be given. It is assumed that at Step S110, the setting is such that the signals of first frequency of the respective systems, that is, GPS-L1 and Galileo-L1 are received. In this case, at Step S140, characteristics are set for receiving GPS-L2C in place of Galileo-L1 so that positioning will be implemented based on two frequencies belonging to GPS. At Step S150, characteristics are set for receiving Galileo-E5a in place of GPS-L1 so that positioning will be implemented based on two frequencies belonging to the Galileo system. (Galileo-E5b or Galileo-E6 may be used in place of Galileo-E5a.)

After the processing of Step S140 or Step S150, the operation proceeds to Step S160, and it is determined whether the state of reception is unacceptable or not. When the state of reception becomes unacceptable (Step S160: YES), the operation returns to Step S110.

The processing illustrated in FIG. 3 uses only satellite-positioning signals belonging to either GPS or the Galileo system in whichever the state of reception is acceptable. When the state of reception of signals is unacceptable in both the satellite-positioning systems (Step S120: YES in FIG. 3), signals of either satellite-positioning system are not used for positioning. However, positioning may be possible sometimes by using together signals of both the satellite-positioning systems. Consequently, control may be carried out so that hybrid reception, illustrated in FIG. 4, can be implemented.

Figure 4:
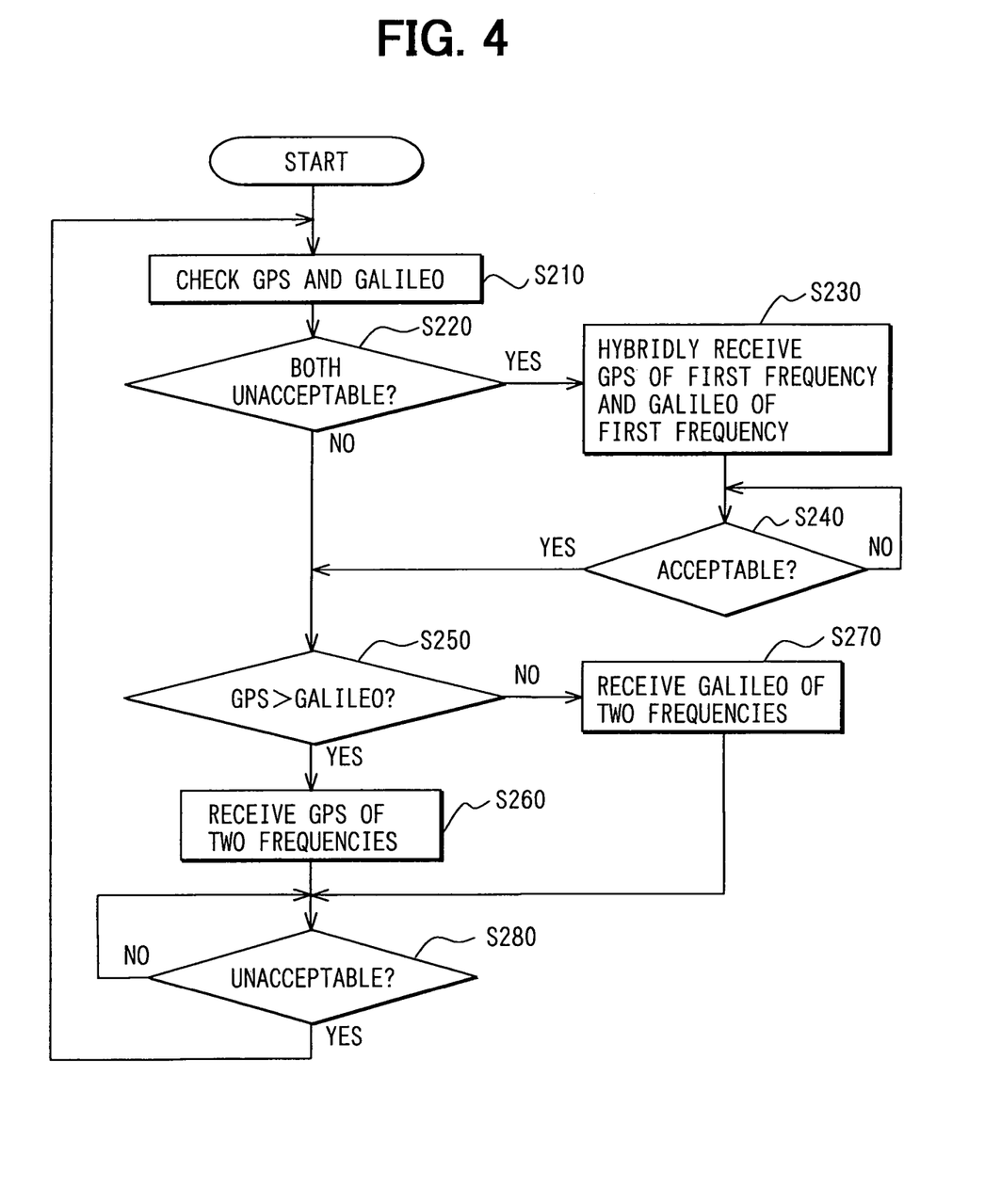
FIG. 4 is a flowchart illustrating the details of processing performed by the digital processor unit when the reception characteristics are changed and set by automatic selection and hybrid reception is carried out according to the first embodiment.

Step S210 and Step S220 in FIG. 4 are the same as Step S110 and Step S120 in FIG. 3, and the description of Step S210 and Step S220 will be omitted. When affirmative determination is made at Step S220, that is, when the state of reception of both the satellite-positioning signals is unacceptable, the operation-proceeds to Step S230. Then, control is carried out so as to implement hybrid reception, in which any satellite-positioning signal belonging to GPS and any satellite-positioning signal belonging to the Galileo system, one frequency in each system, are used. At Step S230, varied processing is possible: the satellite-positioning signal of each system for which the state of reception was checked with the default setting at Step S210 may be directly received and demodulated to data and used for positioning. Alternatively, the reception characteristics of the first reception processing system and the second reception processing system may be controlled so as to receive satellite-positioning signals of different frequencies from system to system. Needless to add, data required for implementing appropriate positioning cannot be obtained sometimes by implementing such hybrid reception. However, the possibility that data required for implementing appropriate positioning could be obtained is enhanced with increase in the number of available satellites, as compared with cases where only satellite-positioning signals of a single satellite-positioning system are used.

After the processing of Step S230, it is determined at Step S240 whether, of both the satellite-positioning signals hybridly received at Step S230, at least either has become acceptable in the state of reception. When neither has become acceptable (Step S240: NO), the determination of Step S240 is repeated. When at least either has become acceptable (Step S240: YES), the operation proceeds to Step S250.

At Step S250, it is determined whether the state of reception of the satellite-positioning signal belonging to GPS is more acceptable than the state of reception of the satellite-positioning signal belonging to the Galileo system or not. When the state of reception of the satellite-positioning signal belonging to GPS is acceptable than the state of reception of the satellite-positioning signal belonging to the Galileo system (Step S250: YES), control is carried out so as to implement positioning based on two frequencies belonging to GPS (Step S260). When the state of reception of the satellite-positioning signal belonging to GPS is not acceptable than the state of reception of the satellite-positioning signal belonging to the Galileo system (Step S250: NO), control is carried out so as to implement positioning based on two frequencies belonging to the Galileo system (Step S270).

After the processing of Step S260 or Step S270, the operation proceeds to Step S280, and it is determined whether the state of reception is unacceptable or not. When the state of reception has become unacceptable (Step S280: YES), the operation returns to Step S210.

In the signal receiving device 1 for satellite positioning in this embodiment, the seven different kinds of satellite-positioning signals, GPS-L1, GPS-L2C, GPS-L5C, Galileo-L1, Galileo-E5a, Galileo-E5b, and Galileo-E6, can be arbitrarily selected and used. Therefore, the signal receiving device 1 for satellite positioning is applicable to a wide variety of intended uses. The device in the embodiment can be configured by two reception processing systems, and different kinds need not be provided in correspondence with the available satellite-positioning signals. That is, the device can be realized with small-scale configuration.

Since the signal receiving device 1 for satellite positioning has two reception processing systems, varied positioning can be implemented. Possible positioning includes: two-frequency positioning based on the same satellite-positioning system (e.g. combination of GPS-L1 and GPS-L2C, combination of GPS-L1 and GPS-L5C, combination of Galileo-L1 and Galileo-E5a, combination of Galileo-L1 and Galileo-E6); and GPS-Galileo hybrid positioning based on the combination of GPS-L1 and Galileo-L1. In case of two-frequency positioning of GPS-L1 and GPS-L2C or Galileo-L1 and Galileo-E5a, for example, the influences of ionospheric delay errors, which are one of the root causes of degradation in precision, can be avoided. In case of hybrid positioning, in which GPS-L1 and Galileo-L1 are simultaneously received, satellite-positioning signals of both the satellite-positioning systems, or GPS and the Galileo system, can be received. Even in environments (e.g. street lined with high rise buildings) in which positioning cannot be conventionally implemented only by GPS, the number of acquirable satellites is increased, and thus positioning becomes implementable.

Second Embodiment

Figure 5:
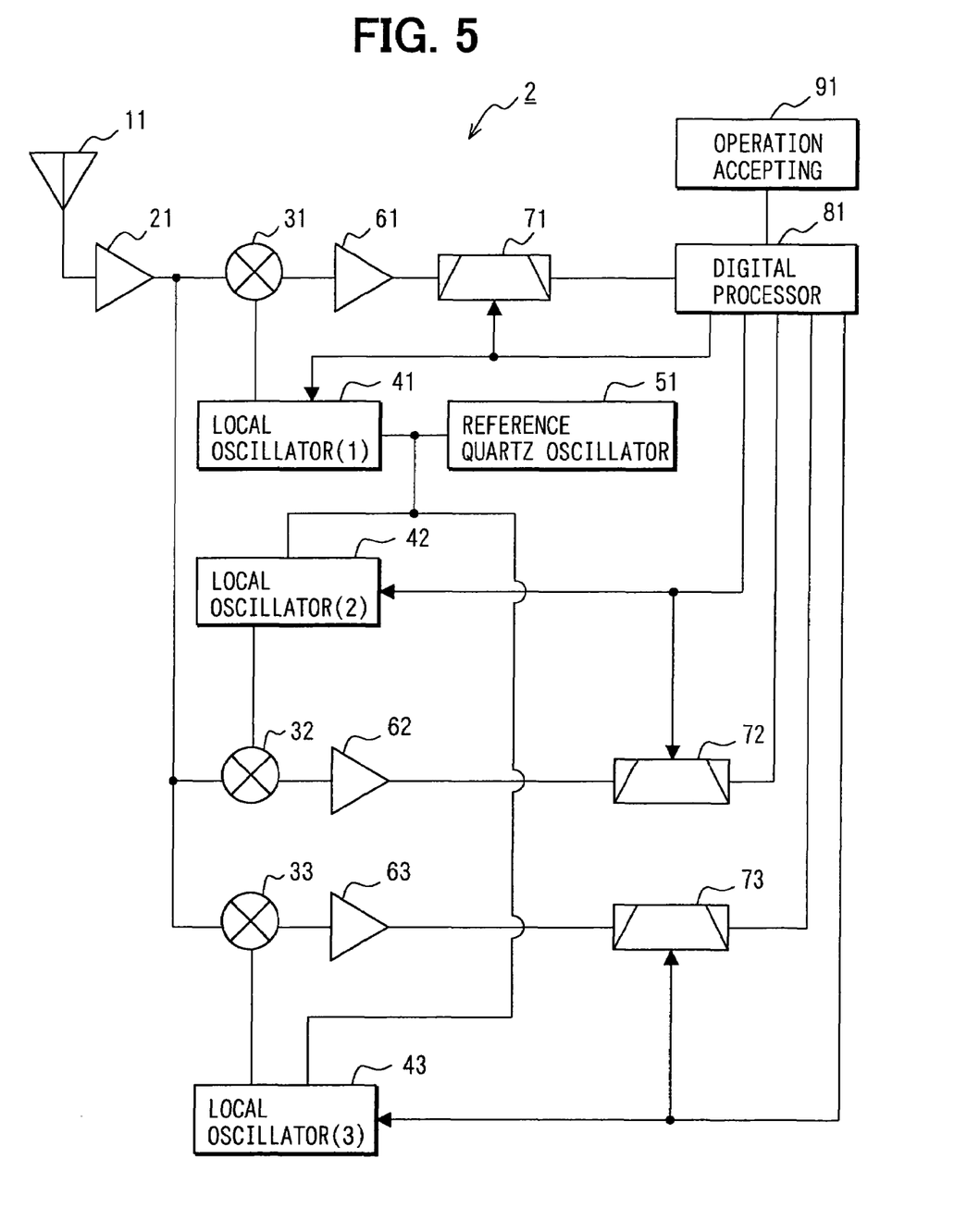
FIG. 5 is a block diagram illustrating a general constitution of the satellite-positioning signal receiving device having three reception processing systems according to a second embodiment of the present invention.

FIG. 5 is a block diagram illustrating the general constitution of a signal receiving device 2 for satellite positioning having three reception processing systems.

This signal receiving device 2 for satellite positioning in the second embodiment is formed by adding a third reception processing system to the constitution of the signal receiving device 1 for satellite positioning in the first embodiment, illustrated in FIG. 1. The third reception processing system includes a mixer unit (3) 33, a local oscillator (3) 43, an IF amplifier unit (3) 63, and an IF filter unit (3) 73. The constitution of the second embodiment is the same as the signal receiving device 1 for satellite positioning in the first embodiment, excepting the third reception processing system.

Like the other local oscillators 41 and 42, the local oscillator (3) 43 in the third reception processing system is also connected to the reference quartz oscillator 51, and generates frequencies according to instructions from the digital processor unit 81 using a reference frequency obtained from the reference quartz oscillator 51. The local oscillator (3) 43 and the IF filter unit (3) 73 in the third reception processing system are also connected to the digital processor unit 81, and the digital processor unit 81 is capable of changing and setting the characteristics of the local oscillator (3) 43 and the IF filter unit (3) 73.

Next, description will be given to the operation of the signal receiving device 2 for satellite positioning in this embodiment.

Like the above-mentioned signal receiving device 1 for satellite positioning in the first embodiment, the signal receiving device 2 for satellite positioning is capable of the following: it can change and set reception characteristics so that satellite-positioning signals selected based on the user's operation accepted at the operation accepting unit 91 (selection corresponding to manual operation). In this case, the details of processing performed by the digital processor unit 81 are the same as illustrated in FIG. 2. Since three reception processing systems are provided, however, three different kinds of satellite-positioning signals can be selected.

Next, description will be given to two examples of the processing performed by the digital processor unit 81 in the following case: the digital processor unit 81 selects satellite-positioning signals or (signal kinds) to be received based on the state of reception of satellite-positioning signals (automatic selection), and changes and sets reception characteristics so that the selected satellite-positioning signals can be received.

Here, description will be given to the following two examples, that is, a case where hysteresis is not involved when the state of reception is determined in changing reception characteristics, and a case where hysteresis is involved.

In Case Hysteresis is Not Involved in Changing

Figure 6:
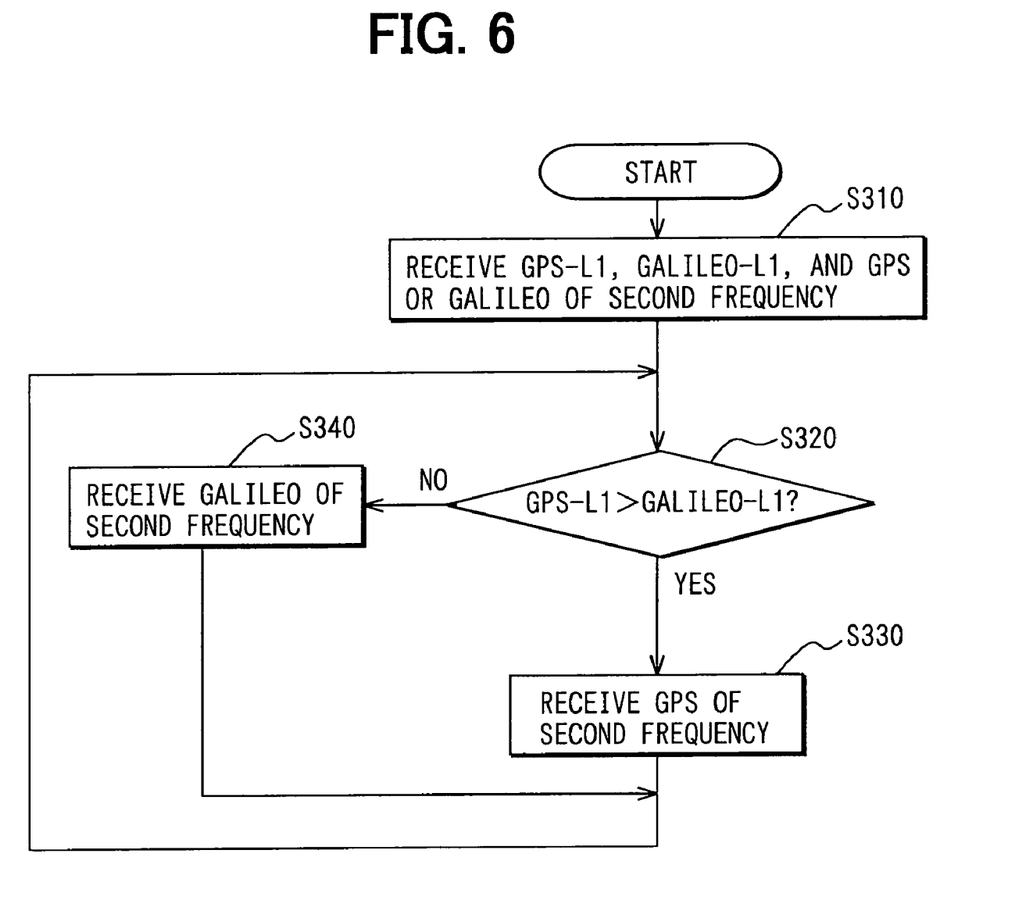
FIG. 6 is a flowchart illustrating the details of processing performed by the digital processor unit when the reception characteristics are changed and set by automatic selection and hysteresis is not involved at the time of changing, according to the second embodiment.

FIG. 6 is a flowchart illustrating the details of processing performed when hysteresis is not involved when the state of reception is determined at the time of reception characteristics change.

First, at the first step, Step S310, GPS-L1 and Galileo-L1 as signals of first frequency belonging to GPS and the Galileo system and a signal of second frequency belonging to either GPS or the Galileo system are adopted as signals to be received (receiving targets). This is the default setting. Then, the frequencies of the local oscillators 41, 42, and 43 and the characteristics of the IF filter units 71, 72, and 73 are changed and set so that these signals will be signals to be received (receiving targets), respectively, in the first to third reception processing systems. Thereafter, the state of reception of each signal is checked. For the signal of the second frequency, for example, GPS-L2C or Galileo-E5a can be adopted. Needless to add, a signal of any other frequency may be used.

At the subsequent step, Step S320, it is determined whether the state of reception of GPS-L1 is more acceptable than that of Galileo-L1 or not. To determine the acceptability of the state of reception, for example, DOP can be used as described above with respect to the first embodiment. Needless to add, it may be determined based on the number of acquirable satellites.

When affirmative determination is made at Step S320, that is, when the state of reception of GPS-L1 is more acceptable than the state of reception of Galileo-L1, the characteristics of the third reception processing system are set so as to receive the GPS signal of the second frequency so that two-frequency positioning will be implemented based on GPS (Step S330). When the default setting at Step S310 is such that the GPS signal of the second frequency is received in the third reception processing system, the setting of characteristics is not substantially changed. When the default setting is such that the signal of the second frequency belonging to the Galileo system is received, the setting of characteristics is changed so that the GPS signal of the second frequency can be received.

When negative determination is made at Step S320, that is, when the state of reception of GPS-L1 is not more acceptable than the state of reception of Galileo-L1, the following processing is performed: the setting of characteristics of the third reception processing system is changed so as to receive the signal of the second frequency belonging to the Galileo system so that two-frequency positioning will be implemented based on the Galileo system (Step S340). When the default setting at Step S310 is such that the signal of the second frequency belonging to the Galileo system is received in the third reception processing system, as in the case of Step S330, the setting of characteristics is not substantially changed. When the default setting is such that the GPS signal of the second frequency is received, the setting of characteristics is changed so that the signal of the second frequency belonging to the Galileo system can be received.

After the processing of Step S330 or Step S340, the operation returns to Step S320, and the processing of Step S320 and the following steps are repeatedly performed.

In Case Hysteresis is Involved in Changing

Figure 7:
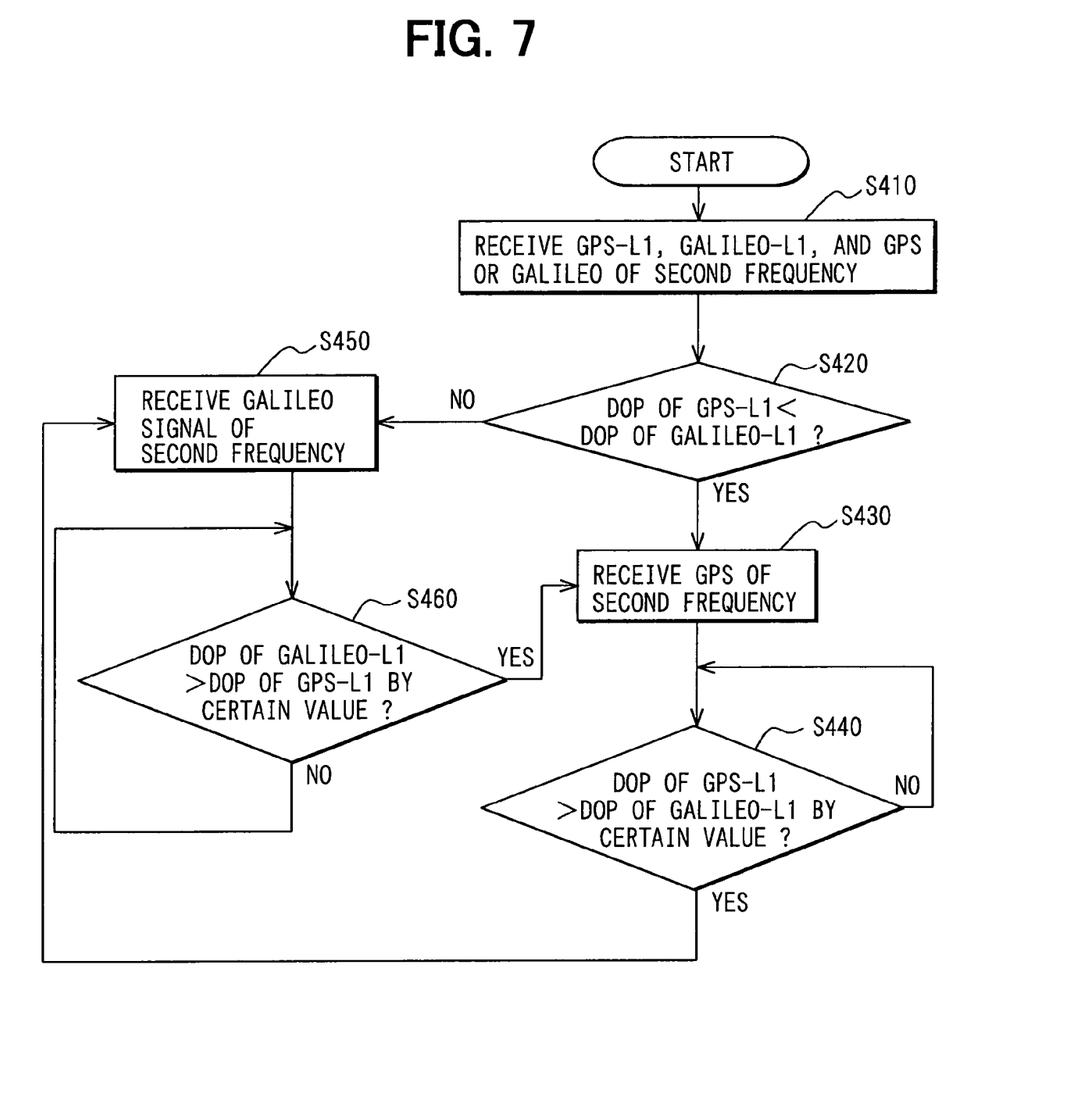
FIG. 7 is a flowchart illustrating the details of processing performed by the digital processor unit when the reception characteristics are changed and set by automatic selection and hysteresis is involved at the time of changing, according to the second embodiment.

FIG. 7 is a flowchart illustrating the details of processing performed when hysteresis is involved when the state of reception is determined at the time of reception characteristics change.

The processing of the first step, Step S410 is the same as the processing of Step S310 in FIG. 6, and the detailed description thereof will be omitted.

At the next step, Step S420, it is determined whether the DOP of GPS-L1 is smaller than the DOP of Galileo-L1. A small value of DOP indicates that the state of reception is acceptable. As mentioned above, the acceptability of the state of reception may be determined based on the number of acquirable satellites. In this embodiment, however, it is determined based on DOP.

When affirmative determination is made at Step S420, that is, GPS-L1 is smaller in DOP than Galileo-L1 (that is, the state of reception of GPS-L1 is more acceptable than that of Galileo-L1), the characteristics of the third reception processing system are set (Step S430). This is done so as to receive the GPS signal of the second frequency so that two-frequency positioning will be implemented based on GPS. When the default setting at Step S410 is such that the GPS signal of the second frequency is received in the third reception processing system, the setting of characteristics is not substantially changed. When the default setting is such that the signal of the second frequency belonging to the Galileo system is received, the setting of characteristics is changed so that the GPS signal of the second frequency can be received.

When negative determination is made at Step S420, that is, when the state of reception of GPS-L1 is not more acceptable than that of Galileo-L1, the characteristics of the third reception processing system are set so as to receive the signal of the second frequency belonging to the Galileo system so that two-frequency positioning will be implemented based on the Galileo system (Step S450). When the default setting at Step S410 is such that the signal of the second frequency belonging to the Galileo system is received in the third reception processing system, as in the case of Step S430, the setting of characteristics is not substantially changed. When the default setting is such that the GPS signal of the second frequency is received, the setting of characteristics is changed so that the signal of the second frequency belonging to the Galileo system can be received.

The operation after the processing of Step S430 or S450 is different from that in the example illustrated in FIG. 6. In the example in FIG. 6, after the processing of Step S330 or S340, the operation returns to Step S320, and the processing of Step S320 and the following steps is repeatedly performed. For this reason, a problem arises when the DOP of GPS-L1 and the DOP of Galileo-L1 are not different from each other so much. The state in which the DOP of GPS-L1 <the DOP of Galileo-L1 (Step S420: YES) and the state in which the DOP of GPS-L1>the DOP of Galileo-L1 (Step S420: NO) can frequently switch.

To cope with this, in the processing illustrated in FIG. 7, hysteresis is taken as a condition for switching, and switching is carried out only when the difference in DOP is equal to or above a certain value. More specific description will be given. When at Step S430, the characteristics of the third reception processing system is set so that the GPS signal of the second frequency will be received, it is determined at Step S440 whether the DOP of GPS-L1 has become greater than the DOP of Galileo-L1 by a certain value or more. That is, it is determined whether the degree to which the state of reception of GPS-L1 has become more unacceptable than that of Galileo-L1 is at a predetermined or higher level or not. The processing of Step S440 is repeated until the DOP of GPS-L1 becomes greater than the DOP of Galileo-L1 by the certain value or more (as long as Step S440: NO). When the DOP of GPS-L1 becomes greater than the DOP of Galileo-L1 by the certain value or more (Step S440: YES), the operation proceeds to Step S450. Then, the signal of the second frequency belonging to the Galileo system is received, and the state of reception transitions to the state in which the two frequencies of the Galileo system are received. When at Step S450, the characteristics of the third reception processing system are set so that the signal of the second frequency belonging to the Galileo system will be received, it is determined at Step S460 whether or not the DOP of Galileo-L1 has become greater than the DOP of GPS-L1 by a certain value or more. That is, it is determined whether or not the degree to which the state of reception of Galileo-L1 has become more unacceptable than that of GPS-L1 is at a predetermined or higher level. The processing of Step S460 is repeated until the DOP of Galileo-L1 becomes greater than the DOP of GPS-L1 by the certain value or more (as long as Step S460: NO). When the DOP of Galileo-L1 becomes greater than the DOP of GPS-L1 by the certain value or more (Step S460: YES), the operation proceeds to Step S430. Then, the GPS signal of the second frequency is received, and the state of reception transitions to the state in which the two frequencies of GPS are received.

The signal receiving device 2 for satellite positioning in the second embodiment not only produces the same effects as the signal receiving device 1 for satellite positioning in the first embodiment does but also brings the following advantages: when only two reception processing systems are provided, as in the first embodiment, degradation in the state of reception is coped with by transitioning to two-frequency reception in either positioning system. In this state, the state of reception in the other system cannot be grasped. This problem can be solved by providing three reception processing systems as in the second embodiment. The state of reception of both the satellite-positioning signals belonging to GPS and the Galileo system can be constantly and simultaneously grasped. For this reason, the acceptability of the state of reception can be relatively determined, and the system relatively in condition can be selected beforehand. Therefore, the second embodiment is desirable because degradation itself in the state of reception can be prevented, as compared with cases where degradation in the state of reception is reactively coped with. Further, by providing hysteresis when the state of reception is determined at the time of changing, as illustrated in FIG. 7, the state of reception can be prevented from frequently switching.

Figure 8:
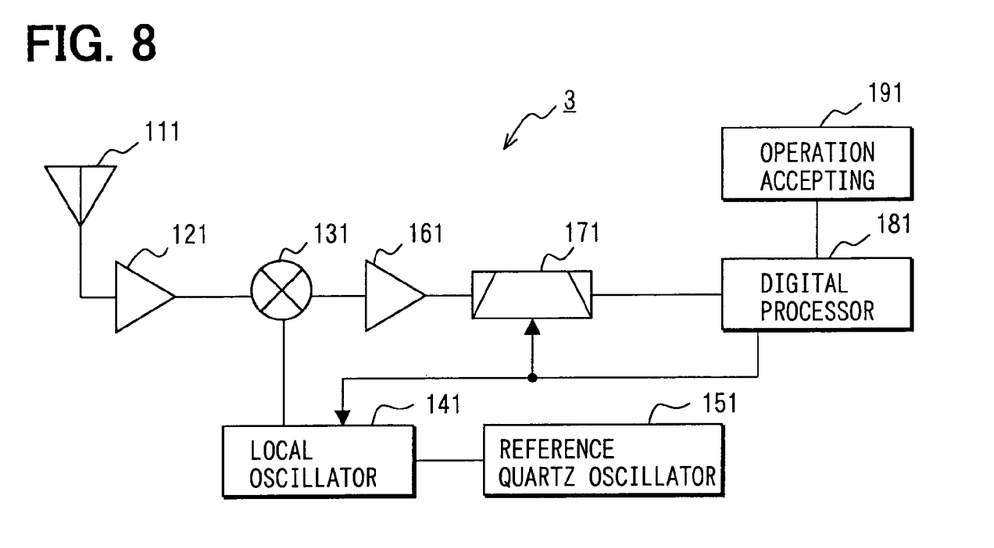
FIG. 8 is a block diagram illustrating a general constitution of the satellite-positioning signal receiving device having one reception processing system according to another embodiment of the present invention.

Other Embodiments (i) In the above description, the first embodiment is provided with two reception processing systems, and the second embodiment is provided with three reception processing systems. The satellite-positioning signal receiving device may be provided with any other number of reception processing systems. When special priority is given to the small-scale configuration of the device, the device may be so constituted that only one reception processing system is provided, as illustrated in FIG. 8. In this case, the signal receiving device 3 for satellite positioning includes: an antenna 111 which receives signals from satellites; an RF amplifier unit 121 which amplifies the signals received by the antenna 111; a reference quartz oscillator 151; a digital processor unit 181 which performs signal processing; an operation accepting unit 191 which accepts the user's operation; a mixer unit 131, a local oscillator 141, an IF amplifier unit 161, and an IF filter unit 171. The digital processor unit 181 is connected to the local oscillator 141 and the IF filter unit 171, and is so constituted that it can change and set the characteristics of them.

Even with such a constitution, the following operation can be performed: satellite-positioning signals to be received (as a receiving target) are selected based on the user's operation accepted at the operation accepting unit 191. Alternatively, satellite-positioning signals to be received (receiving targets) are selected by the digital processor unit 181. Then the characteristics of the local oscillator 141 and the IF filter unit 171 are changed and set. Accordingly, one satellite-positioning signal, selected from among two or more different kinds of satellite-positioning signals, can be received.

(ii) The above embodiments are described with GPS and the Galileo system taken as concrete examples. When any other satellite-positioning system becomes available, the satellite-positioning signals belonging to that satellite-positioning system can be taken as signals to be received.

It will be obvious to those skilled in the art that various changes may be made in the above-described embodiments of the present invention. However, the scope of the present invention should be determined by the following claims.

What is claimed is:

1. A satellite-positioning signal receiving device which receives a satellite-positioning signal transmitted in a form of radio waves from an artificial satellite for use in a satellite-positioning system, the satellite-positioning signal receiving device comprising:

n reception processing systems, each of which performs processing for receiving a satellite-positioning signal kind and is formed so that its reception characteristic is changed, wherein the n is an integer not less than one;

a selecting unit that selects n different satellite-positioning signal kinds from within m different satellite-positioning signal kinds, wherein the m is an integer not less than two; and a controlling unit that changes the reception characteristics of the n reception processing systems to correspond to the selected n different satellite- positioning signal kinds.

2. The satellite-positioning signal receiving device according to claim 1
wherein at least two reception processing systems are provided.

3. The satellite-positioning signal receiving device according to claim 1
wherein the selecting unit determines an acceptability of a reception state of each of satellite-positioning signal kinds received by the reception processing systems, and
wherein the selecting unit selects a receiving target whose reception state is relatively acceptable, based on the determined acceptability.

4. The satellite-positioning signal receiving device according to claim 1,
wherein at least two reception processing systems are provided, and
wherein the selecting unit determines an acceptability of a reception state of each of satellite-positioning signal kinds corresponding to two different satellite-positioning systems received by the two reception processing systems, respectively, and
wherein the selecting unit selects as a receiving target a signal kind whose reception state is relatively acceptable from within the received satellite-positioning signal kinds corresponding to the two different satellite-positioning systems.

5. The satellite-positioning signal receiving device according to claim 1,
wherein at least two reception processing systems are provided, and
wherein the selecting unit determines an acceptability of a reception state of each of satellite-positioning signal kinds corresponding to two different satellite-positioning systems received by the two reception processing systems, respectively, and
wherein, when the reception state of each of the received satellite-positioning signal kinds corresponding to the two different satellite-positioning systems is not at a predetermined acceptable level, the selecting unit selects, as a receiving target for each of the two different reception processing systems, each of the received satellite-positioning signal kinds corresponding to the two different satellite-positioning systems.

6. The satellite-positioning signal receiving device according to claim 1,
wherein at least three reception processing systems are provided as a first reception processing system, a second reception processing system, and a third reception processing system,
wherein the selecting unit selects as a receiving target for each of the first reception processing system and the second reception processing system,
a satellite-positioning signal kind of a first carrier frequency corresponding to each of two different satellite-positioning systems, the each of the two different satellite-positioning systems including at least two carrier frequencies including the first carrier frequency,
wherein the selecting unit determines an acceptability of a reception state of each of satellite-positioning signal kinds of the first carrier frequency corresponding to the first satellite-positioning system and the first carrier frequency corresponding to the second satellite-positioning system received by the first reception processing system and the second reception processing system, respectively, and
wherein the selecting unit selects, as a receiving target for the third reception processing system, a satellite-positioning signal kind of another carrier frequency corresponding to, within the two satellite-positioning systems, a satellite-positioning system corresponding to whichever of the two satellite-positioning signal kinds of the first carrier frequencies has a more acceptable reception state than the other.

7. The satellite-positioning signal receiving device according to claim 6,
wherein, when the selecting unit selects the reception target signal for the third reception processing system, the selecting unit determines whether a difference is at a level not lower than a predetermined level, wherein the difference is between the reception states of the satellite-positioning signal kinds of the first carrier frequency corresponding to the first satellite-positioning system and the first carrier frequency corresponding to the second satellite-positioning system received by the first reception processing system and the second reception processing system, respectively, and
wherein, when the difference is determined to be at the level not lower than the predetermined level, the selecting unit selects, as the receiving target for the third reception processing system, a satellite-positioning signal kind of another carrier frequency corresponding to, within the two satellite-positioning systems, a satellite-positioning system corresponding to whichever of the two satellite-positioning signal kinds of the first carrier frequencies has a more acceptable reception state than the other.

8. The satellite-positioning signal receiving device according to claim 1, wherein:
the m different satellite-positioning signal kinds are included in one satellite-positioning system and different from each other in a carrier frequency as one of the reception characteristics;
the carrier frequency of the each reception processing system is changed from a first carrier frequency to a second carrier frequency; and
the controlling unit changes the carrier frequency of the each reception processing system from the first carrier frequency to the second carrier frequency to correspond to the selected n different satellite-positioning signal kinds.

9. The satellite-positioning signal receiving device according to claim 1, wherein:
the m different satellite-positioning signal kinds are included in at least two satellite-positioning systems and are different from each other in the reception characteristic including one of a carrier frequency and a satellite-positioning system;
the each reception processing system is formed so that the one of the carrier frequency and the satellite-positioning system is changed from a first one to a second one; and
the controlling unit changes the one of the carrier frequency and the satellite-positioning system of the each reception processing system from the first one to the second one to correspond to the selected n different satellite-positioning signal kinds.

10. The satellite-positioning signal receiving device according to claim 1, wherein the satellite-positioning system is one of (i) a global positioning system (GPS), and (ii) a Galileo system.

11. The satellite-positioning signal receiving device according to claim 10, wherein the GPS includes at least one of the following three satellite-positioning signal kinds: (i) GPS-L1 (1575.42±1 MHz); (ii) GPS-L2C (1227.6±1 MHz); and (iii) GPS-L5C (1176.45±10 MHz).

12. The satellite-positioning signal receiving device according to claim 10, wherein the Galileo system includes at least one of the following four satellite-positioning signal kinds: (i) Galileo-L1 (1575.42±2 MHz); (ii) Galileo-E5a (1176.45±10 MHz); (iii) Galileo-E5b (1207.14±10 MHz); and Galileo-E6 (1278.75±5.115 MHz).

13. The satellite-positioning signal receiving device according to claim 4, wherein the two different satellite-positioning systems include (i) a global positioning system (GPS), and (ii) a Galileo system.

14. The satellite-positioning signal receiving device according to claim 5, wherein the two different satellite-positioning systems include (i) a global positioning system (GPS), and (ii) a Galileo system.

15. The satellite-positioning signal receiving device according to claim 6, wherein the two different satellite-positioning systems include (i) a global positioning system (GPS), and (ii) a Galileo system.

* * * * *